United States Patent Office 3,755,392
Patented Aug. 28, 1973

3,755,392
DIHYDROCARBYL (PHENOLATO) TIN CARBOXYLATES
Toshio Seki, Osaka, Japan, assignor to Nitto Kasei Co., Ltd., Osaka, Japan
No Drawing. Original application May 9, 1967, Ser. No. 637,057, now Patent No. 3,632,551. Divided and this application Mar. 3, 1971, Ser. No. 120,685
Int. Cl. C07f 7/22
U.S. Cl. 260—429.7                    6 Claims

ABSTRACT OF THE DISCLOSURE

This invention relates to the method for stabilizing synthetic resins against the deteriorating effects of heat and light and comprises incorporating into said resin an inhibiting amount of a compound having the following formula (I) 

wherein:

(1) R is selected from the group consisting of alkyl of from 1 to 8 carbon atoms, aryl, and benzyl,
(2) X is a residue of the formula

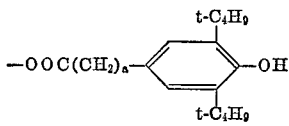

in which $a$ is an integer of from 0 to 2, inclusive, and,
(3) Y is a residue of the formula

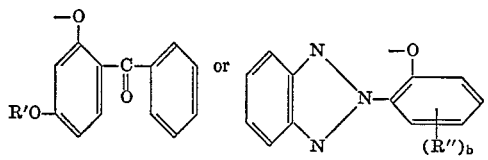

in which R' and R'' are alkyl of from 1 to 8 carbon atoms, and $b$ is an integer of from 0 to 2, inclusive.

---

This application is a division of co-pending application Ser. No. 637,057, filed May 9, 1967, now U.S. Pat. No. 3,632,551.

This invention relates to novel organotin compounds, to the preparation of such compounds, and to synthetic resins stabilized with said organotin compounds.

It is known that certain organic compounds may be added as ultraviolet light absorbers, and antioxidants to synthetic resins which are subject to the influence of light, and to thermal oxidation. However, many of the known stabilizers may be characterized by unsatisfactory stabilizing ability because of thermal decomposition, volatilization, and sublimation during the process of producing films, fibers, or other molded articles. Furthermore, poor compatibility of the stabilizers with synthetic resins may cause plating-out, blooming, and bleeding. In addition, prior art stabilizers individually may fail to prevent simultaneous deterioration of resins from both light and heat.

According to the present invention, these adverse effects may be reduced or eliminated by employing a new class of organotin compounds as stabilizers.

It is an object of this invention to provide novel organotin compounds and methods of producing such compounds. A further object of this invention is to provide synthetic resins stabilized with one or more of these novel organotin compounds. Other objects will be apparent to those skilled-in-the-art from the following description.

In accordance with certain of its aspects, the method of this invention for stabilizing synthetic resins against the deteriorating effects of heat and light comprises incorporating into said resin an inhibiting amount of a compound having the following formula (I) 

wherein:

(1) R is selected from the group consisting of alkyl of from 1 to 8 carbon atoms, aryl, and benzyl,
(2) X is a residue of the formula

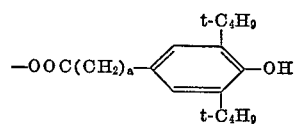

in which $a$ is an integer of from 0 to 2, inclusive, and,
(3) Y is a residue of the formula

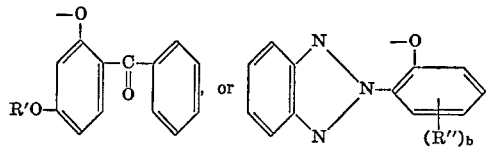

in which R' and R'' are alkyl of from 1 to 8 carbon atoms, and $b$ is an integer of from 0 to 2, inclusive.

In accordance with certain aspects of this invention, organotin compounds included in Formula I may be prepared by heating (1) a compound of the formula (II) 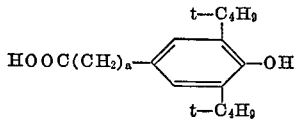

wherein $a$ is as defined above, (2) a compound of the formula (III) 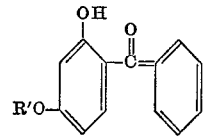

or (IV) 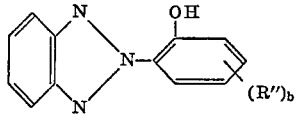

wherein $b$, R', and R'' are as defined above, and (3) a diorganotin oxide (or alkoxide) in the stoichiometric molar ratio, for example, in the presence of an inert solvent such as benzene, toluene, xylene, etc. or in the absence of solvent until all the water (or alcohol) of reaction is removed. Other compounds within the general Formula I may be prepared by heating (1) an alkali metal salt of compound (II) wherein the alkali metal attaches to a carboxyl group, (2) an alkali metal salt of compound (III) or (IV) wherein the alkali metal attaches to a hydroxide group, and (3) a diorganotin dihalide in the presence of benzene, toluene, xylene, etc., and removing the alkali metal halide which forms from the reaction system.

Examples of suitable diorganotin oxides for said reaction include dimethyltin oxide, dipropyltin oxide, dibutyltin oxide, diamyltin oxide, dioctyltin oxide, dibenzyltin oxide, diphenyltin oxide, etc. Examples of diorganotin dialkoxides include dibutyltin dimethoxide, dibutyltin diethoxide, diamyltin dimethoxide, dioctyltin dimethoxide, etc. Examples of diorganotin dihalides include dimethyltin dichloride, dibutyltin dichloride, dioctyltin dichloride, etc. Examples of compounds of Formula II include β-3,5-t-butyl - 4 - hydroxyphenyl propionic acid, 3,5-di-t-butyl-4-hydroxybenzoic acid, etc. Examples of compounds of Formula III include 2-hydroxy-4-methoxybenzophenone, 2-hydroxy-4-butoxybenzophenone, 2-hydroxy- 4 - octoxybenzophenone, etc. Examples of compounds of Formula IV include 2-(2'-hydroxyphenyl)-benzotriazole, 2-(2'-hydroxy - 5' - methyl phenyl)-benzotriazole, 2-(2'-hydroxy - 3' - t-butyl-5'-methyl phenyl) benzotriazole, etc. Examples of alkali metals include sodium, potassium, etc.

Specific examples of the organotin compounds which are within the scope of this invention include, among others, the following:

(1)
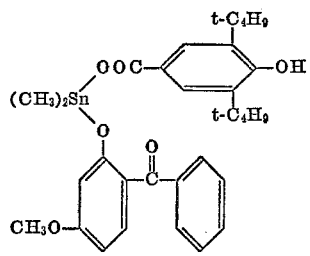

(2)
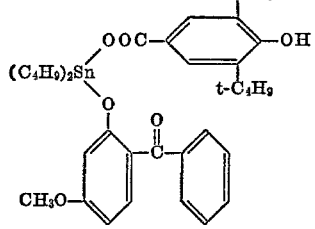

(3)
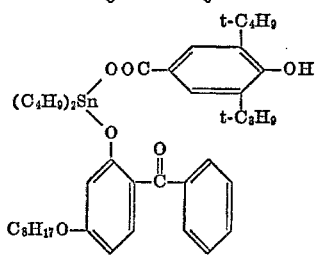

(4)
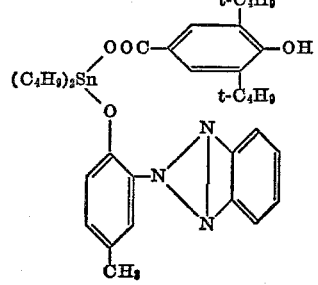

(5)
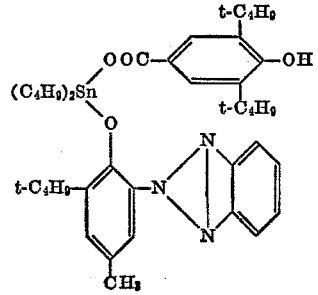

(6)
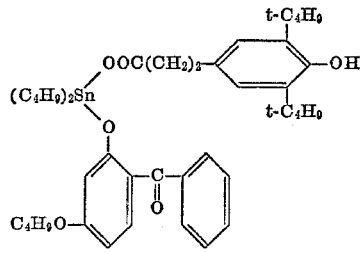

(7)
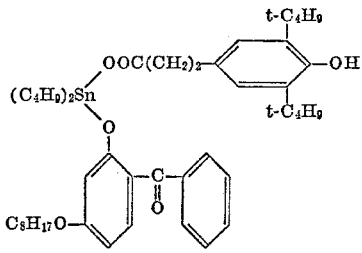

(8)
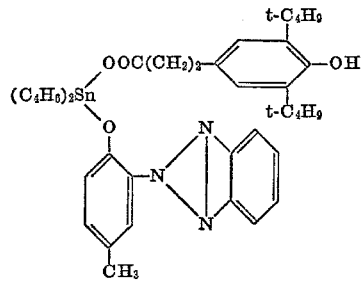

(9)
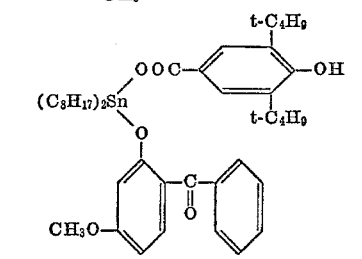

(10)
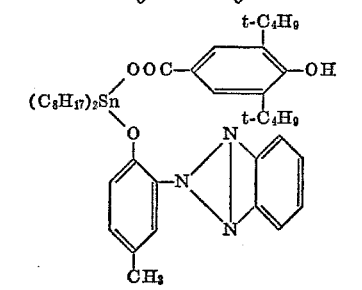

(11)
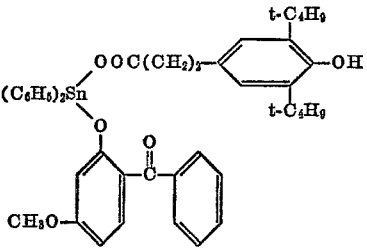

(12)
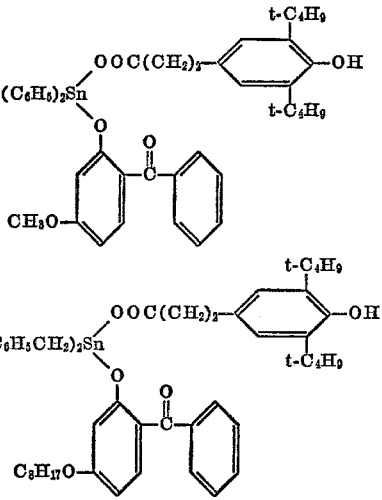

The following table designated as Table I shows that the volatility weight loss of these organotin compounds is very little at a high temperature (180° C.) such that a synthetic resin including conventional stabilizers starts decomposing at an increasing tempo, and the conventional stabilizers start volatilizing to a degree from the synthetic resin. In addition when and/or after the synthetic resin including the organotin stabilizer is molded, a lowering of transparency and phenomena of plating-out, blooming, and bleeding may not be observed. This shows a good compatibility of the organotin stabilizer with the synthetic resin.

TABLE I

| Organotin compound: | Percent volatile loss 180° C./(10 mins.) |
|---|---|
| 1 | 4.90 |
| 2 | 2.70 |
| 3 | 1.85 |
| 4 | 2.88 |
| 5 | 0.06 |
| 6 | 0.14 |
| 7 | 1.33 |
| 8 | 0.89 |
| 9 | 0.45 |
| 10 | 0.56 |
| 11 | 0.30 |
| 12 | 1.26 |
| 2,6-di-t-butyl-4-methyl phenol | 36.30 |
| 2-hydroxy-4-methoxybenzophenone | 32.20 |

These organotin stabilizers may be combined with or incorporated into the synthetic resins in several ways. For instance, the organotin compound or mixture of compounds may be added to the synthetic resins prior to or during polymerization. After the addition of the organotin compound, the admixture may be polymerized and molded into films, fibers, or other articles. Alternatively, the organotin compound may be added to the synthetic resin together with other additives such as another stabilizer, a U.V. absorber, a coloring agent, an antioxidant, a mold lubricant, etc. by mixers, e.g. a ribbon blender, a high-speed mixer, etc. after which the mixture may be molded into films, fibers, or other articles. Only an inhibiting amount of organotin compound is required. Preferably, the amount of the organotin stabilizers to be employed in the process of this invention is in the range of 0.01 to 5% by weight based on the weight of the synthetic resins, which will vary depending upon the kind of molded articles and the manner in which the organotin compounds are added.

The synthetic resins which may be stabilized by the method of this invention include ABS (Acrylonitrile-Butadiene-Styrene) resins, acetal resins, fluoroplastics, acrylic resins, alkyd resins, amino resins, urethane resins, epoxy resins, polyamide resins, polycarbonates, polyolefins, polystyrenes, vinyl chloride resins, synthetic rubbers, etc.

The process of this invention is of great advantage to the production of synthetic resins when such resins are molded at a high temperature. This is a special commercial advantage, since conventional stabilizers sublimate considerably from resins when treated at a temperature above 170° C., and the amount used of them in synthetic resin formulations must be increased necessarily to be effective as stabilizer. The organotin compounds of this invention are also profitable in that, the effects of a plurality of said organotin compounds and already known stabilizers, e.g. a sulfur-containing compound (a peroxide decomposer for polyolefin), a dibutyltin compound, a dioctyltin compound, a metallic soap, and a lead compound (stabilizers for vinyl chloride resin) are synergistic in their stabilizing effects.

EXAMPLE 1

A dispersed system of equimolecular amounts of dibutyltin oxide (24.9 g., 0.1 mole), 3,5-di-t-butyl-4-hydroxybenzoic acid (25.0 g.), and 2-hydroxy-4-methoxybenzophenone (22.8 g.) in 250 ml. of xylene was heated at reflux temperature for 5 hours, whereupon water was removed in the azeotrope of xylene which distilled off, and a uniform, clear solution was obtained. The xylene was then distilled off from the resulting reaction solution under reduced pressure at 110° C. to yield 69.5 g. of a Compound 2 of the formula (2)

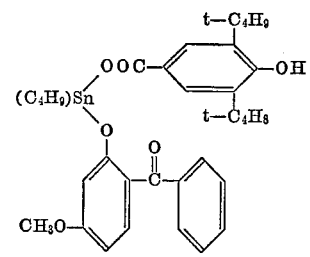

Analysis.—Calc. for $C_{37}H_{50}O_6Sn$ (percent): C, 62.36; H, 6.90; Sn, 16.62. Found (percent): C, 62.64; H, 7.10, Sn, 16.73.

To polyvinyl chloride resin composition containing as mold lubricant 2% by weight of butyl stearate was added the stabilizer in the proportion noted in Table II below, and after milling for 15 minutes on a mixing roll heated at surface temperature of 160° C. the mixture was made into a sheet 1 mm. thick. The sheet was then put in a Geer oven at 180° C. for 80 minutes for a heat stability test, and was separately tested in a fadeometer (Toyo Rika, Japan) for light resistance, being irradiated for 200 hours. Results are shown in Table II.

TABLE II

| Stabilizing composition | Initial sheet color | Color of sheet after— | |
|---|---|---|---|
| | | Lighting 200 hours | Heating 180° C./ 80 minutes |
| 2% by weight of dibutyltin maleate | Pale yellow | Yellow | Brownish yellow. |
| 2% by weight of dibutyltin maleate plus 0.2% by weight of 2,6-di-t-butyl-4-methyl phenol. | Colorless | Pale yellow | Yellow. |
| 2% by weight of dibutyltin maleate plus 0.2% by weight of Compound 2. | Colorless | Colorless | Pale yellow. |
| 2% by weight of tri-basic lead sulphate | White | Light yellow | Brown. |
| 2% by weight of tri-basic lead sulphate plus 0.2% by weight of 2,6-di-t-butyl-4-methyl phenol. | White | Pale yellow | Brownish yellow. |
| 2% by weight of tri-basic lead sulphate plus 0.2% by weight of Compound 2. | White | White | White. |

EXAMPLE 2

A mixture of equimolecular amounts of dibutyltin dimethoxide (29.5 g., 0.1 mole), 3,5-di-t-butyl-4-hydroxybenzoic acid (25.0 g.), and 2-hydroxy-4-octoxybenzophenone (32.6 g.) was heated with stirring at 135–140°

C. for 2 hours, and the methanol which formed was removed leaving 79.2 g. of a Compound 3 of the formula (3)

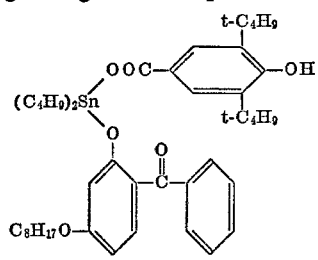

*Analysis.*—Calc. for $C_{44}H_{64}O_6Sn$ (percent): C, 64.98; H, 7.90; Sn, 14.49. Found (percent): 65.54; C, 7.99; Sn, 14.70.

To polyethylene was added 0.2% by weight of said organotin Compound 3 as stabilizer of this invention and 0.4% by weight of dilauryl thiodipropionate, and after milling for 10 minutes on a mixing roll heated to 180° C. the mixture was made into a sheet 1 mm. thick. The sheet was then pressed at 130° C. to be made smooth on the surface, and was put in a Geer oven at 140 C. for a heat stability test. A sheet containing Compound 3 alone without said synergistic mixture therein, and one containing no stabilizer were made and tested by the same procedure as above. Results are shown in Table III.

H, 8.10; Sn, 14.66. Found (percent): C, 65.22; H, 8.00; Sn, 14.60.

An ABS resin composition containing as stabilizer 0.5% by weight of said organotin Compound 10 was injection-molded into a flat plate 2 mm. thick by conventional method. The ABS resin composition was subjected to heat at 190° C. for 6 minutes during the injecton-molding step. The obtained plate was white. The plate was tested in a Geer oven at 180° C. for heat stability, and its color change was observed after 90 minutes. The plate was hardly discolored.

For purposes of comparison, the same plate without the addition of any stabilizer, and the one with 0.5% by weight of 2,6-di-t-butyl phenol in place of the organotin stabilizer (10) of this invention were made and tested for heat stability by the same procedure as above. The former became yellow in color immediately after it had been injection-molded, and became brown after it had been put in a Geer oven for 60 minutes. The latter was white immediately after it had been injection-molded, and became pale yellow after it had been put in a Geer oven for 30 minutes, and became yellow after 60 minutes, and brown after 90 minutes.

EXAMPLE 5

A dispersed system of equimolecular amounts of dimethyltin dichloride (22.0 g., 0.1 mole), sodium 3,5-di-t-

TABLE III

| Stabilizer | After (hours)— | | | |
| --- | --- | --- | --- | --- |
| | 20 | 100 | 400 | 600 |
| None | Cracked | Cracked | Cracked and yellowed. | Cracked and yellowed. |
| Compound 3 | Unchanged. | Unchanged. | Unchanged. | Cracked. |
| Compound 3 plus dilauryl thiodipropionate | do | do | do | Unchanged. |

EXAMPLE 3

Heat stability tests similar to those of Example 2 were carried out except that polypropylene was used as a synthetic resin which may be stabilized by the method of this invention. Results are shown in Table IV.

butyl-4-hydroxybenzoate (27.2 g.), and sodium 2-benzoyl-5-methoxyphenolate (25.0 g.) in 250 ml. of toluene was heated at reflux temperature for 5 hours. The reaction mixture was then filtered to remove sodium chloride which formed, and the solvent was distilled off under reduced

TABLE IV

| Stabilizer | After (hours)— | | | |
| --- | --- | --- | --- | --- |
| | 20 | 100 | 400 | 600 |
| None | Cracked | Cracked | Cracked | Cracked. |
| Compound 3 | Unchanged. | Unchanged | do | Do. |
| Compound 3 plus dilauryl thiodipropionate | do | do | Unchanged | Unchanged. |

EXAMPLE 4

A mixture of equimolecular amounts of dioctyltin diethoxide (43.5 g., 0.1 mole), 3,5-di-t-butyl-4-hydroxybenzoic acid (25.0 g.), and 2-(2'-hydroxy-5'-methyl phenyl) benzotriazole (22.5 g.) was heated with stirring at 140–145° C. for 2.5 hours, and the ethanol which formed was removed leaving 78.5 g. of Compound 10 of the formula (20)

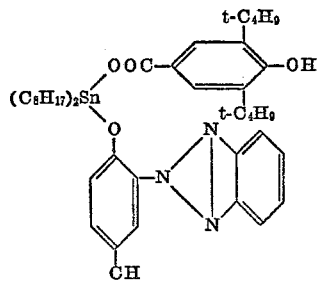

*Analysis.*—Calc. for $C_{44}H_{65}O_4SnN_3$ (percent): C, 65.27;

pressure at 100° C. to yield 60.0 g. of a Compound 1 of the formula (1)

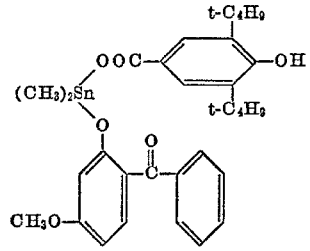

*Analysis.*—Calc. for $C_{31}H_{38}O_6Sn$ (percent): C, 59.54; H, 6.13; Sn, 18.98. Found (percent): C, 59.50; H, 6.01; Sn, 18.90.

A polystyrene composition containing as stabilizer 0.6% by weight of said organotin Compound 1 was injection-molded into a flat plate by conventional method, being subjected to heat at 180° C. for 5 minutes. The obtained plate was colorless and transparent and was not discolored after allowed to stand in a room for two years. The same flat plate without the addition of any stabilizer, which was prepared for comparison by the same procedure as above was clear pale yellow in color when molded, and turned yellow with markedly lowered transparency after allowed to stand in a room for two years.

EXAMPLE 6

A dispersed system of equimolar amounts of dioctyltin oxide (36.1 g., 0.1 mole), 3,5-di-t-butyl-4-hydroxybenzoic acid (25.0 g.), and 2 - hydroxy - 4-methoxybenzophenone (22.8 g.) in 250 ml. of xylene was heated at reflux temperature for 6 hours and the water removed. The solvent was then distilled off under reduced pressure at 110° C. to yield 78.9 g. of a Compound 9 of the formula (9)
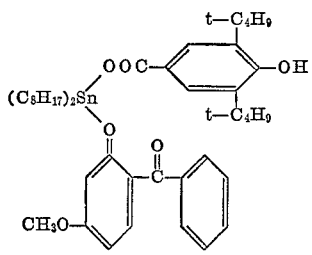

*Analysis.*—Calc. for $C_{45}H_{66}O_6Sn$ (percent): C, 65.78; H, 8.09; Sn, 14.44. Found (percent): C, 65.65; H, 7.92; Sn, 14.38.

A polycarbonate composition containing 0.5% by weight of said organotin Compound 9 was injection-molded into a disk by conventional method, being subjected to heat at 260° C. for 10 minutes. The obtained disk was colorless and transparent. For comparison, the same disk without the addition of any stabilizer was prepared under similar conditions. The thus obtained disk was light brown.

EXAMPLE 7

A dispersed system of equimolecular amounts of diphenyltin dichloride (34.4 g., 0.1 mole), sodium β-3,5-di-t-butyl - 4 - hydroxyphenyl propionate (30.0 g.), and sodium 2 - benzoyl - 5 - methoxyphenolate (25.0 g.) in 350 ml. toluene was heated at reflux temperature for 7 hours and sodium chloride which formed was removed. The solvent was then distilled off under reduced pressure at 100° C. to yield 73.9 g. of a Compound 11 of the formula

(11)
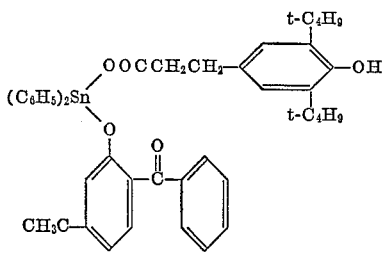

*Analysis.*—Calcd. for $C_{43}H_{46}O_6Sn$ (percent): C, 66.42; H, 5.97; Sn, 15.26. Found (percent): C, 66.91; H, 5.78; Sn, 14.99.

One hundred parts by weight of polyoxypropylene triol (GP–3025, Mitsui Chem. Ind. Co., Ltd., Japan),
0.35 part by weight of stannous octoate (T–9, M&T Chemicals Inc.),
1.5 parts by weight of surface active agent (L–520, Union Carbide Corporation),
0.1 part by weight of triethylenediamine (DABCO, Houndry Process & Chemical Company),
4.5 parts by weight of water, and
0.08 to 0.8 part by weight of said organotin Compound 11 were mixed intimately with gentle stirring, and 54.5 parts by weight of tolylene diisocyanate (80/20) added with vigorous agitation. When the mixture began to foam, it was poured into a corrugated cardboard container. The foamed polyurethane was then exposed to sunlight and weathering outdoors. The discoloration was noted, and the color is reported in Table V below.

TABLE V

| Concentration of stabilizer (part by weight) | Exposed for— | |
|---|---|---|
| | 3 days | 7 days |
| Blank | Yellow | Brownish yellow. |
| 0.08 | Light yellow | Light yellow. |
| 0.16 | White | Do. |
| 0.40 | do | White. |
| 0.80 | do | Do. |

Although this invention has been illustrated by reference to specific example, numerous changes and modifications thereof which clearly fall within the scope of the invention will be apparent to those skilled-in-the-art.

What is claimed is:

1. The compound having the formula

wherein:
(1) R is selected from the group consisting of alkyl radicals containing from 1 to 8 carbon atoms, aryl radicals and benzyl radicals,
(2) X is a residue of the formula

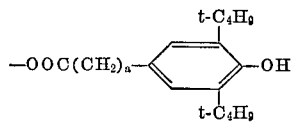

wherein *a* is an integer between 0 and 2, inclusive, and
(3) Y is a residue of the formula

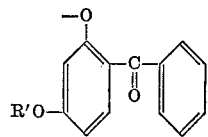

wherein R' represents an alkyl radical containing between 1 and 8 carbon atoms.

2. The compound as claimed in claim 1 having the formula

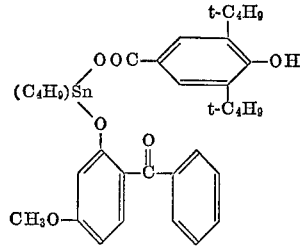

3. The compound as claimed in claim 1 having the formula

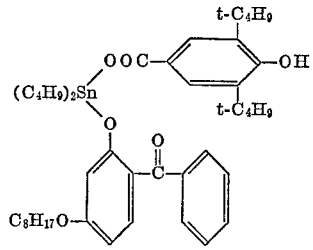

4. The compound as claimed in claim 1 having the formula
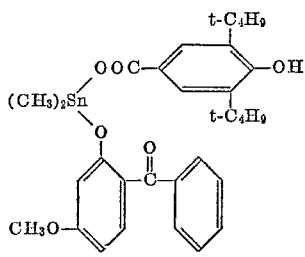
5. The compound as claimed in claim 1 having the formula
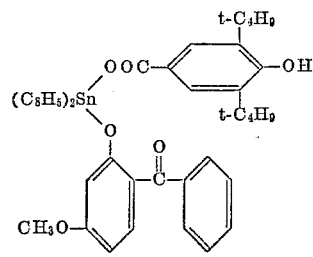
6. The compound as claimed in claim 1 having the formula
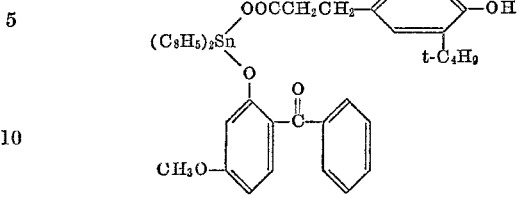
References Cited
UNITED STATES PATENTS
| | | | |
|---|---|---|---|
| 3,565,929 | 2/1971 | Seki et al. | 260—429.7 |
| 2,832,750 | 4/1958 | Weinberg et al. | 260—429.7 |
| 3,208,968 | 9/1965 | Cyba et al. | 260—429.7 |
| 3,216,969 | 11/1965 | Cyba et al. | 260—429.7 |
| 3,268,567 | 8/1966 | Cyba et al. | 260—429.7 |
| 3,290,247 | 12/1966 | Wilson et al. | 260—429.7 |
| 3,415,875 | 12/1968 | Leuthi et al. | 260—429.7 |
WERTEN F. W. BELLAMY, Primary Examiner
U.S. Cl. X.R.
260—45.75 K